US009159069B1

(12) United States Patent
Dravneek

(10) Patent No.: US 9,159,069 B1
(45) Date of Patent: Oct. 13, 2015

(54) SYSTEM FOR ENCODING CUSTOMER DATA

(71) Applicant: Bank of America Corporation, Charlotte, NC (US)

(72) Inventor: Victoria L. Dravneek, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/518,076

(22) Filed: Oct. 20, 2014

(51) Int. Cl.
*G06K 15/00* (2006.01)
*G06Q 30/00* (2012.01)

(52) U.S. Cl.
CPC ............ *G06Q 30/01* (2013.01); *G06Q 2250/00* (2013.01)

(58) Field of Classification Search
CPC ........... G06F 7/00; G06F 17/00; G06F 17/30; G06K 15/00; G06K 19/00
USPC ............. 235/383, 375, 376, 487; 707/100, 10
See application file for complete search history.

(56) References Cited

U.S. PATENT DOCUMENTS

| | | | |
|---|---|---|---|
| 6,016,482 A | 1/2000 | Molinari et al. | |
| 6,473,745 B2 | 10/2002 | Doerr et al. | |
| 7,580,850 B2 | 8/2009 | Lurie | |
| 7,844,519 B2 | 11/2010 | Wehunt et al. | |
| 7,848,974 B1 | 12/2010 | Sheehan | |
| 8,055,564 B2 | 11/2011 | Wehunt et al. | |
| 8,255,490 B1 * | 8/2012 | Porter et al. | 709/219 |
| 8,392,305 B2 | 3/2013 | Wehunt et al. | |
| 8,521,628 B1 | 8/2013 | Gowen et al. | |
| 8,548,930 B2 | 10/2013 | Ross | |
| 8,751,342 B2 | 6/2014 | Krein et al. | |
| 2003/0101182 A1 * | 5/2003 | Govrin et al. | 707/7 |
| 2004/0205708 A1 * | 10/2004 | Kothari et al. | 717/113 |
| 2005/0021540 A1 * | 1/2005 | McKee et al. | 707/100 |
| 2005/0065970 A1 * | 3/2005 | King et al. | 707/102 |
| 2007/0156727 A1 * | 7/2007 | Lim | 707/100 |
| 2009/0276368 A1 | 11/2009 | Martin et al. | |
| 2010/0312609 A1 * | 12/2010 | Epshtein et al. | 705/10 |
| 2011/0166976 A1 | 7/2011 | Krein et al. | |
| 2011/0208586 A1 | 8/2011 | Joa et al. | |
| 2011/0283270 A1 * | 11/2011 | Gass et al. | 717/168 |
| 2013/0054314 A1 | 2/2013 | Ross et al. | |
| 2013/0254038 A1 * | 9/2013 | Bradley et al. | 705/14.64 |
| 2014/0114759 A1 | 4/2014 | Mallean et al. | |

* cited by examiner

*Primary Examiner* — Edwyn Labaze
(74) *Attorney, Agent, or Firm* — Michael A. Springs

(57) ABSTRACT

A rules engine stores a first rule, a second rule, and customer data. The rules engine transforms a portion of the customer data into a first code segment by applying the first rule and transforms a portion of the customer data into a second code segment by applying the second rule. In addition, the rules engine combines at least the first code segment and the second code segment to form a customer profile code. The generated customer profile code is associated with a customer identifier. A decision engine communicatively coupled to the rules engine matches the customer identifier of the customer profile code to third party data associated with a request for customer information. An interface engine communicatively coupled to the decision engine communicates the customer profile code to a third party if the customer identifier of the customer profile code matches the third party data.

20 Claims, 3 Drawing Sheets

SYSTEM FOR ENCODING CUSTOMER DATA

TECHNICAL FIELD

This invention relates generally to analyzing and communicating data, and more particularly to encoding customer data.

BACKGROUND

Enterprises assemble vast amounts of customer data. In conventional systems, enterprises communicate uncoded customer data in accordance with a customer identifier, such as a customer account number. This is problematic because uncoded data is susceptible to security breaches and uncoded data uses a substantial amount of resources, such as bandwidth and memory.

SUMMARY OF EXAMPLE EMBODIMENTS

According to embodiments of the present disclosure, disadvantages and problems associated with communicating customer data may be reduced or eliminated.

In accordance with a particular embodiment of the present disclosure, a rules engine stores a first rule, a second rule, and customer data, wherein the customer data is associated with a particular customer. The rules engine transforms a portion of the customer data into a first code segment by applying a first rule and transforms a portion of the customer data into a second code segment by applying a second rule. In addition, the rules engine combines at least the first code segment and the second code segment to form a customer profile code. The customer profile code is associated with a customer identifier. A decision engine communicatively coupled to the rules engine stores third party data, wherein the third party data is associated with a request for customer information. The decision engine determines whether the customer identifier of the customer profile code matches the third party data, and an interface engine communicatively coupled to the decision engine communicates the customer profile code to a third party if the customer identifier of the customer profile code and the third party data match.

Certain embodiments of the present disclosure may provide one or more technical advantages. A technical advantage of one embodiment includes saving resources such as bandwidth and memory by consolidating large amounts of customer data within an enterprise into a centralized unit and transforming that data, on a customer by customer basis, into a unique customer profile code. As another example, a technical advantage of one embodiment includes mitigating data breaches by communicating secured customer data to third parties via a customer profile code. And a further technical advantage of an embodiment includes conveniently, efficiently, and securely transferring customer data to third parties by sharing an enterprise's encoded customer profile code with a third party via a secure application programming interface (API). As a final example, a technical advantage of one embodiment includes providing greater efficiencies for computer resources and network usage.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
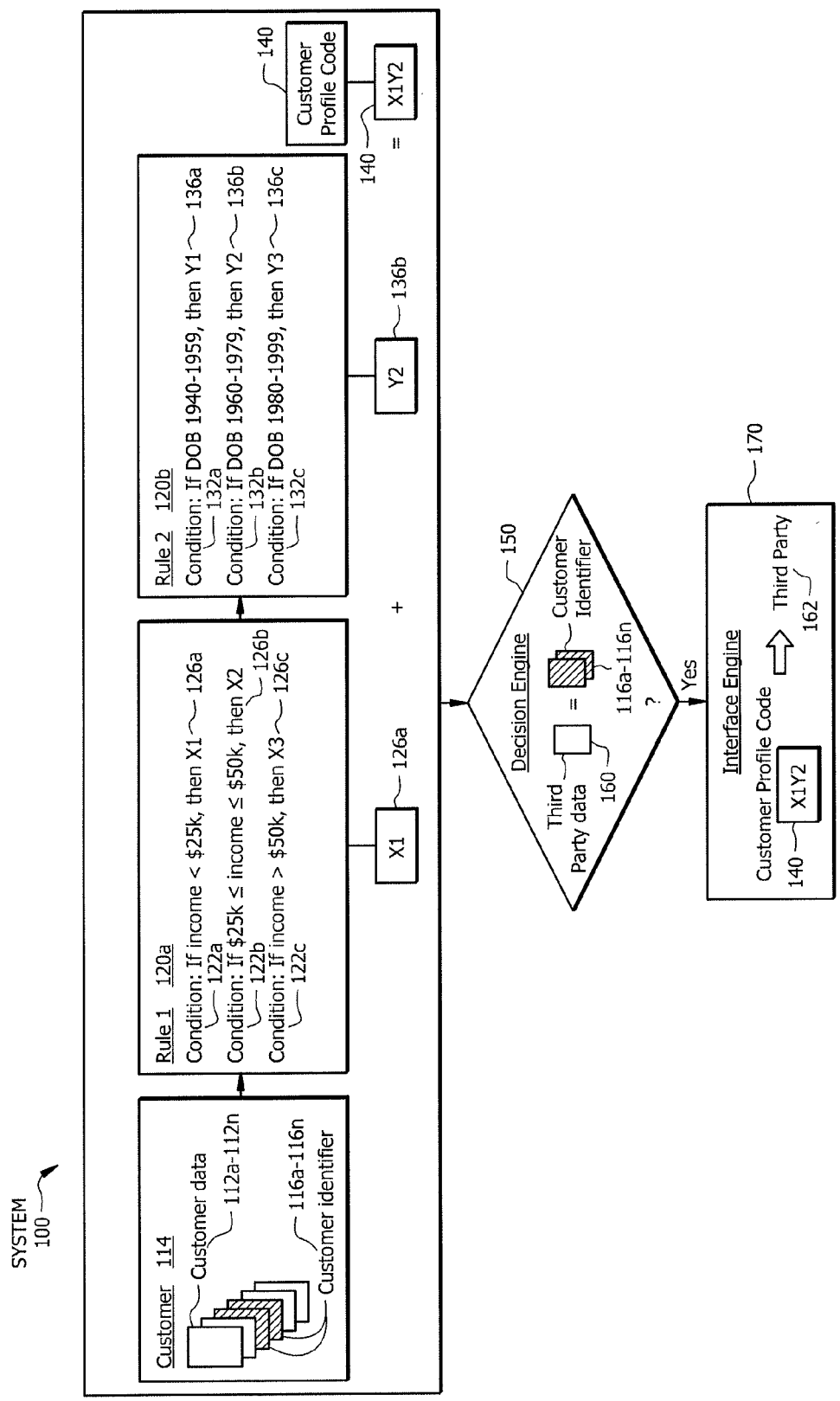
FIG. 1 illustrates an example embodiment of a system for encoding customer data.
Figure 2:
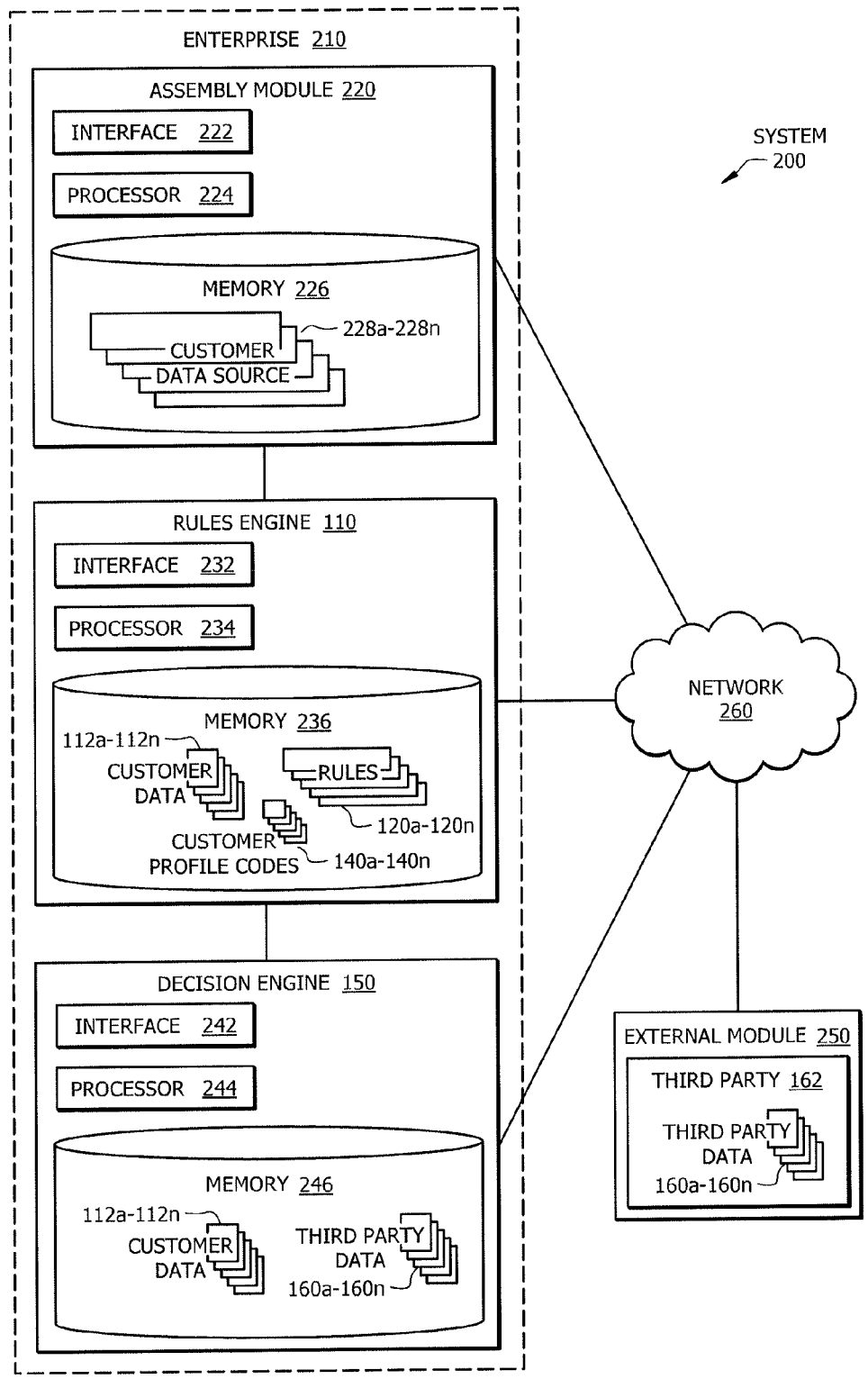
FIG. 2 illustrates a block diagram of an example system for encoding customer data.
Figure 3:
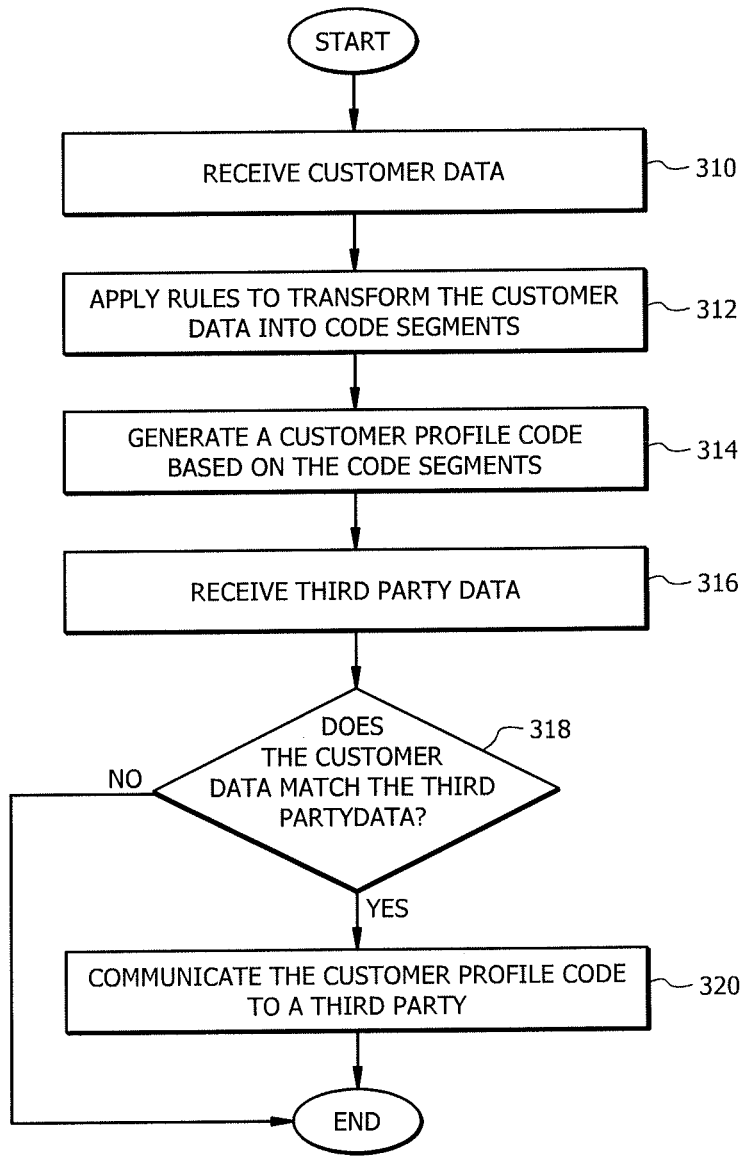
FIG. 3 illustrates an example embodiment of a method for encoding customer data.

Embodiments of the present invention and its advantages are best understood by referring to FIGS. 1, 2, and 3, like numerals being used for like and corresponding parts of the various drawings.

Enterprises are organizations and typically include business units, divisions, or lines of businesses that handle the trade of various goods and services within the enterprise. Services may include, but are not limited to, transforming customer data into customer profile codes so that it can be efficiently and securely shared with third parties.

To facilitate providing encoded customer data, enterprises may communicate encoded customer profile codes to third parties via networks. Typically, enterprises store customer data according to a customer identifier, such as a customer account number. The teachings of this disclosure recognize that it would be desirable to provide a rules engine that transforms the customer data into code segments and combines the code segments to form a customer profile code, thus creating a snapshot of the customer data. The teachings of this disclosure also recognize that it would be desirable to provide a decision engine that communicates a customer profile code to a third party if the customer identifier associated with the customer profile code matches third party data. Further, the teachings of this disclosure recognize that when a customer identifier of a customer profile code matches third party data, it would be desirable to communicate the rules and the code segments to a third party to enable the third party to decode the customer profile code.

As such, the teachings of this disclosure provide for greater efficiencies in computer resources and network usage. For example, by transforming vast amounts of customer data into compressed customer profile codes, less resources such as bandwidth and memory are required to store the customer data and to communicate the customer data both internally within the enterprise and externally to third parties. Further, the teachings of this disclosure provide for greater security of an enterprise's customer data. For instance, by encoding the customer data, the enterprise reduces the risk of third parties gaining access to its customer data without the enterprise's consent.

FIG. 1 illustrates a system for encoding customer data. More specifically, system 100 includes rules engine 110, decision engine 150, and interface engine 170. Generally, rules engine 110, decision engine 150, and interface engine 170 interact to efficiently analyze, transform, and communicate customer data.

In the illustrated embodiment of FIG. 1, rules engine 110 stores customer data 112, first rule 120a, and second rule 120b. Customer data 112a-112n represents the data of a particular customer 114, wherein n represents any suitable number. Customer data 112 may include descriptive data such as, for example, customer 114's age, gender, ethnicity, spoken languages, employment status, and income. Further, customer data 112 may include behavioral data, or general patterns exhibited by customer 114 when using certain products or services. For example, behavioral data may include customer 114's purchasing, browsing, and registering activities, bank account activities, loan and mortgage commitments, and investment information. Behavioral data may also include, for instance, the frequency in which customer 114 visits an institution or call center, customer 114's inquiries at an institution or call center, and customer 114's recorded conversations with an associate of an enterprise. Customer data 112 is not limited to descriptive and behavioral data and can include any data associated with customer 114.

In addition, customer data 112 may comprise one or more customer identifiers 116. Customer identifier 116 is any identifier associated with customer 114 that differentiates customer 114 from other customers of an enterprise. For example, customer identifier 116 may be a phone number, an email address, or an account number of customer 114. In some embodiments, customer identifier 116 may include customer 114's physical address or customer 114's driver's license number. Customer identifier 116 can be any data suitable to identify customer 114.

Rules 120a-120n of rules engine 110 include any parameters for classifying customer data 112. For example, rules 120 may facilitate classification of customer data 112 in accordance with customer 114's income, transactional history, credit rating, or date of birth. Rules 120a-120n may be created or managed by devices, persons, or any other suitable source. For example, associates may write specific rules for third party 162. As another example, software may be used to evolve rules 120a-120n over time based on patterns shown by system 100.

Rules engine 110 of system 100 also includes first rule 120a as shown in FIG. 1 of the illustrated embodiment. First rule 120a may include one or more conditions 122a-122n, wherein n represents any suitable number. First rule 120a may also include one or more code segments 126a-126n, wherein n represents any suitable number. In some embodiments, conditions 122a-122n are associated with code segments 126a-126n. For example, condition 122f may be associated with code segment 126f. In the illustrated embodiment of FIG. 1, conditions 122a, 122b, and 122c are associated with income brackets. Customer data 112g may represent customer 114's income. As such, if customer income data 112g falls below $25,000 annually, then rules engine 110 transforms 112g into code segment 126a, which is represented by "X1" in FIG. 1. Similarly, if customer income data 112g falls at or between $25,000 and $50,000 annually, then rules engine 110 transforms customer income data 112g into code segment 126b, represented by "X2". And if customer income data 112g is above $50,000 annually, then rules engine 110 transforms customer income data 112g into code segment 126c, represented by "X3". For example, if customer income data 112g is $15,000 annually, then rules engine 110 transforms customer income data 112g into code segment "X1", as shown in the illustrated embodiment of FIG. 1.

Though only one condition is satisfied in the illustrated embodiment of FIG. 1, more than one condition may be satisfied in other embodiments, or no condition may be satisfied, depending on the parameters of customer data 112. Further, in some embodiments, first rule 120a includes less than three conditions. Alternatively, first rule 120a may include more than three conditions, for example ten conditions. Further, conditions 122a, 122b, and 122c may be associated with more than one type of customer data. For example, condition 122a may be associated with customer 114's income whereas conditions 122b and 122c are associated with customer 114's quantity of purchases within a given period of time.

In some embodiments, rules engine 110 of system 100 further comprises second rule 120b. Second rule 120b may include one or more conditions 132a-132n, wherein n represents any suitable number. Second rule 120b may also include one or more code segments 136a-136n, wherein n represents any suitable number. In some embodiments, conditions 132a-132n are associated with code segments 136a-136n. For example, condition 132g may be associated with code segment 136g. In the illustrated embodiment of FIG. 1, conditions 132a, 132b, and 132c are associated with birth year brackets. Customer data 112h may represent customer 114's birth year. As such, if birth year customer data 112h falls at or between the years "1940" and "1959", then rules engine 110 transforms customer data 112h into code segment 132a, represented by "Y1". Similarly, if birth year customer data 112h falls at or between the years "1960" and "1979", then rules engine 110 transforms customer data 112h into code segment 132b, represented by "Y2". And if birth year customer data 112h falls at or between the years "1980" and "1999", then the rules engine transforms customer data 112h into code segment 132c, represented by "Y3". For example, if birth year customer data 112h is the year "1967", then rules engine 110 transforms customer birth year data 112h into code segment "Y2", as shown in the illustrated embodiment of FIG. 1.

While first rule 120a includes three conditions 122a, 122b, and 122c, and second rule 120b includes three conditions 132a, 132b, and 132c in the illustrated embodiment of FIG. 1, rules engine 110 of system 100 may include more or less than two rules, and each rule may include more or less than three conditions. For example, rules engine 110 may comprise 1,000 rules, wherein each rule includes 100 conditions. As another example, rules engine 110 may comprise a first rule with five conditions, a second rule with 100 conditions, and a third rule with one condition. Conditions 122a-122n and 132a-132n may be associated with more than one type of customer data 112. For example, condition 122a may be associated with customer 114's birth year, condition 122b may be associated with customer 114's purchases, and condition 122c may be associated with customer 114's income. Further, while rules 120a and 120b in the illustrated embodiment include conditions, rules 120a-120n may instead or in addition include any suitable information for use in the operation of rules engine 110.

In some embodiments, rules engine 110 of system 100 transforms at least a portion of customer data 112a-112n into a customer profile code 140 based on at least a combination of code segments 126a-126n and 136a-136n. For example, as shown in the illustrated embodiment of FIG. 1, rules engine 110 concatenates code segment 126a, represented by "X1", and code segment 136b, represented by "Y2", to generate customer profile code 140, represented by "X1Y2". In some instances, rules engine 110 may concatenate more than two code segments to generate customer profile code 140, for example "X1Y2Z3". Rules engine 110 may transform customer data 112a-112n in any manner suitable for compressing or securing customer data 112a-112n. For example, transforming customer data 112a-112n may include encoding, encrypting, or hashing customer data 112a-112n.

While rules engine 110 in the illustrated embodiment of FIG. 1 concatenates code segments 126a and 136b to form customer profile code 140, rules engine 110 may transform code segments 126a-126n and 136a-136n in any manner suitable for coding data. For instance, code segments 126a ("X1") and 136b ("Y2") may jointly be represented by alphanumeric characters "A1", by the number "10", or by a symbol, such as a triangle. Further, customer profile code 140 may utilize any coding system suitable to protect against the unauthorized use of customer 140's information. For example, customer profile code 140 may be an alphanumeric code, as shown in the illustrated embodiment of FIG. 1. As another example, customer profile code may be a binary code. Rules engine 110 may generate customer profile codes 140 for multiple customers 114a-114n.

Some customer profile codes 140 may be more sophisticated than other customer profile codes 140. For instance, a customer with a large amount of customer data 112 may have a more sophisticated customer profile code 140 than a customer with a less amount of customer data 112. Further, in some embodiments customer profile code 140 is associated with customer identifier 116. Customer identifier 116 may be located within customer data 112a-112n and can be any data that differentiates customer 114 from other customers of enterprise 210. For example, customer identifier 116 may be customer 114's social security number, customer 114's bank account number, or customer 114's email address.

Rules engine 110 of system 100 may apply rules 120a-120n to customer data 112 on a periodic or continuous basis to generate customer profile code 140. For example, rules engine 110 may generate customer profile code 140 periodically by applying rules 120a-120n to customer data 112 once every minute, once a week, or three times a week. As another example, rules engine 110 may apply rules 120a-120n to customer data 112 in real time so that the customer profile code 140 is always based on the most recent customer data 112a-112n. In some embodiments, rules engine 110 may only apply certain rules to the exclusion of others to generate customer profile code 140. Similarly, rules engine 110 may only apply certain conditions to the exclusion of others to generate customer profile code 140.

System 100 as shown in the illustrated embodiment of FIG. 1 also includes decision engine 150. Decision engine 150 is communicatively coupled to rules engine 110 and is operable to store third party data 160 associated with a request for customer information. Third party data 160 is information that can be used to identify customer 114 of enterprise 210, such as an email address, a telephone number, a social security number, or a bank account number. Decision engine 150 may also store customer data 112a-112n, customer identifiers 116a-116n, or a portion thereof.

Decision engine 150 is further operable to determine whether customer identifier 116 of customer profile code 140 matches third party data 160. For example, if customer identifier 116 is represented by phone number 555-0102, and third party data 160 is represented by phone number 555-0102, then decision engine 150 verifies a match between customer identifier 116 and third party data 160. In some embodiments, decision engine 150 may determine whether third party data 160 matches more than one customer identifier 116a-116n. For instance, system 100 may require that two pieces of third party data, for example 160a and 160b, match two customer identifiers, for example 116a and 116b.

System 100 of the illustrated embodiment of FIG. 1 also includes an interface engine 170. Interface engine 170 is communicatively coupled to decision engine 150 and operable to communicate customer profile code 140 to third party 162 if customer identifier 116 of customer profile code 140 matches third party data 160. Third party 162 can be any party external to enterprise 210 that can benefit from receiving customer information that has been transformed into code segments based on conditions such as income and birth year. Examples of third parties 162 include e-commerce sites, social media sites, or financial sites such as financial planning websites. In addition, third party 162 may be a realty site or an aggregator.

Interface engine 170 of system 100 may be further operable to communicate rules 120a-120n, conditions, 122a-122n and 132a-132n, and code segments 126a-126n and 136a-136n to third party 162 to facilitate decoding of customer profile code 140. For example, if customer identifier 116 of customer profile code 140 matches third party data 160, interface engine 170 may communicate first rule 120a and second rule 120b to third party 160. Further, if customer identifier 114 of customer profile code 140 matches third party data 160, interface engine 170 may communicate the code segments associated with the satisfied conditions to third party 162 to enable third party 162 to decode customer profile code 140. As such, in accordance with the illustrated embodiment of FIG. 1, third party 162 can utilize code segment 126a ("X1") to associate third party data 160 with an income less than $25,000 annually. Similarly, third party 162 can utilize code segment 136b ("Y2") to associate third party data 160 with a date of birth between the years 1960 and 1979.

Interface engine 170 of system 100 may operate as an application programming interface (API). As such, interface engine 170 may communicate customer profile code 140 to third party 162 by granting third party 162 access to customer profile code 140 via the API. In addition, interface engine 170 may communicate rules 120a-120n, conditions, 122a-122n and 132a-132n, and code segments 126a-126n and 136a-136n to third party 162 by granting third party 162 access to the API. By utilizing a secure API, an enterprise can efficiently and conveniently share customer profile codes and other information operable to decode the customer profile codes with third parties.

Transforming customer data 112 into customer profile codes 140 leads to greater efficiencies of system 100. Because customer profile codes 140 represent compressed versions of customer data 112, they can be stored using less memory and communicated using less bandwidth. Further, customer profile codes 140 are less susceptible to breach since they are encoded. And because customer profile codes 140 represent satisfied conditions rather than specific customer data 112a-112n, customer data 112a-112n of enterprise 210 remains protected.

Modifications, additions, or omissions may be made to system 100 without departing from the scope of the invention. For example, system 100 may include any number of rules engines 110, decision engines 150, and interface engines 170. As another example, decision module 150 may request third party data 160 from an external module. Furthermore, the components of system 100 may be integrated or separated. For example, rules engine 110 and decision engine 150 may be incorporated into a single component. In another example, decision engine 150 and interface engine 170 may be incorporated into a single component.

FIG. 2 illustrates a system for encoding customer data. More specifically, system 200 includes enterprise 210, assembly module 220, rules engine 110, decision engine 150, and external module 250. Generally, assembly module 220, rules engine 110, and decision engine 150 interact to efficiently assemble, analyze, and communicate data. Assembly module 220, rules engine 110, and decision 150 may be located internal or external to enterprise 210. Assembly module 220, rules engine 110, decision engine 150, external module 250, and other components within system 200 may be communicatively coupled by network 260.

In the illustrated embodiment of FIG. 2, assembly module 220 comprises interface 222, processor 224, and memory 226. Memory 226 of assembly module 220 includes customer data sources 228a-228n, wherein n represents any suitable number. Customer data sources 228a-228n may be associated with customer 114 and may include customer data 112a-112n, such as demographic and behavioral data of customer 114.

Customer data sources 228a-228n of assembly module 220 represent any sources of information that may be used by assembly module 220 and/or components of enterprise 210. Customer data sources 228a-228n may include a device (such as a database, a personal computer, a workstation, a laptop, a wireless or cellular telephone, an electronic notebook, a personal digital assistant, or any other device capable of receiving, processing, storing, and/or communicating information), a person (such as a person who has knowledge of an entity and who provides such knowledge for communication to assembly module 220), any other suitable source of information, or any combination of the preceding. In certain embodiments, assembly module 220 may receive information from customer data sources 228a-228n to communicate to rules engine 110 and decision engine 150. Customer data sources 228a-228n may be located in enterprise 210 or any other location that allows for customer data sources 228a-228n to communicate via network 260.

Assembly module 220 may include a network service, any suitable remote service, a mainframe, a host computer, a workstation, a web server, a personal computer, a file server, or any other suitable device operable to communicate with enterprise 210. In some embodiments, assembly module 220 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. The functions of assembly module 220 may be performed by any suitable combination of one or more servers or other components at one or more locations. In the embodiment where the modules are servers, the servers may be public or private servers, and each server may be a virtual or physical server. The server may include one or more servers at the same or at remote locations. Also, assembly module 220 may include any suitable component that functions as a server.

System 200 of the illustrated embodiment of FIG. 2 also includes rules engine 110, which is communicatively coupled to assembly module 220. Rules engine 110 may include interface 232, processor 234, and memory 236. In the illustrated embodiment, memory 236 includes customer data 112a-112n, rules 120a-120n, and customer profile codes 140a-140n. System 200 of the illustrated embodiment of FIG. 2 further includes decision engine 150. Decision engine 150 is communicatively coupled to rules engine 110 and may comprise interface 242, processor 244, and memory 246. In the illustrated embodiment, memory 246 includes customer data 112a-112n and third party data 160a-160n. In addition, system 200 comprises external module 250, as shown in the illustrated embodiment of FIG. 2. External module 250 includes third party data 160a-160n.

Network 260 facilitates communications between enterprise 210, assembly module 220, rules engine 110, decision engine 150, and external module 250. This disclosure contemplates any suitable network 260 operable to facilitate communication between the components of system 200. Network 260 may include any interconnecting system capable of transmitting audio, video, signals, data, messages, or any combination of the preceding. Network 260 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of network 260.

System 200 includes one or more interfaces. For example, the illustrated embodiment of FIG. 2 includes interface 222 for assembly module 220, interface 232 for rules engine 110, and interface 242 for decision engine 150. Interfaces 222, 232, and 242 represent any suitable device operable to receive information from network 260, transmit information through network 260, perform suitable processing of the information, communicate to other devices, or any combination of the preceding. For example, interface 222 of assembly module 220 transmits customer data 112a-112n to rules engine 110, and interface 232 of rules engine 110 receives customer data from interface 222. As another example, interface 242 of decision engine 150 may receive third party data 160 from external module 250 and may communicate customer profile code 140 to external module 250 if customer identifier 116 matches third party data 160. Interfaces 222, 232, and 242 represent any port or connection, real or virtual, including any suitable hardware and/or software, including protocol conversion and data processing capabilities, to communicate through a LAN, WAN, or other communication system that allows enterprise 210 to exchange information between assembly module 220, rules engine 110, decision engine 150, external module 250, network 260, and other components of system 200.

In addition, system 200 includes one or more processors. For example, the illustrated embodiment of FIG. 2 includes processor 224 for assembly module 220, processor 234 for rules engine 110, and processor 244 for decision engine 150. Processors 224, 234, and 244 control the operation and administration of enterprise 210 by processing information received from interfaces 222, 232, and 242. As such, processors 224, 234, and 244 are communicatively coupled to interfaces 222, 232, 242, respectively. Processors 224, 234, 244, and 254 include any hardware and/or software that operates to control and process information. For example, processor 234 utilizes rules 120a-120n to control the operation of rules engine 110. Processor 224, 234, or 244 may be a programmable logic device, a microcontroller, a microprocessor, any suitable processing device, or any suitable combination of the preceding.

System 200 further includes one or more memories. For example, the illustrated embodiment of FIG. 2 includes memory 226 for assembly module 220, memory 236 for rules engine 110, and memory 246 for decision engine 150. Memory 226, 236, or 246 may represent a database that stores, either permanently or temporarily, customer data 112a-112n or rules 120a-120n. Memory 226, 236, or 246 includes any one or a combination of volatile or non-volatile local or remote devices suitable for storing information. For example, memory 226, 236, or 246 may include Random Access Memory ("RAM"), Read-only Memory ("ROM"), magnetic storage devices, optical storage devices, or any other suitable information storage device or a combination of these devices. Memory 226, 236, or 246 may include any suitable information for use in the operation of enterprise 210. Additionally, memory 226, 236, or 246 may be a component external to enterprise 210 and may be situated in any location suitable for memory to communicate to the other modules of system 200. Assembly module 220, rules engine 110, and decision engine 150 can each contain more than one memory component.

Memory 226, 236, or 246 may include one or more rules 120a-120n. Rules 120a-120n generally refer to logic, rules, algorithms, code, tables, and/or other suitable instructions embodied in a computer-readable storage medium for performing the described functions and operations of system 200. For example, rules 120a-120n may facilitate the transformation of a portion of customer data 112a-112n into code segments 126a-126n.

System 200 may include one or more computers. A computer may be any device that interacts with system 200. A computer may use a processor and a memory to execute an application in order to perform any of the functions described herein. A computer may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of system 200. A computer may also include a user interface, such as a display, a touchscreen, a microphone, keypad, or other appropriate terminal equipment usable by a user.

A component of system 200 may include an interface, logic, memory, and/or other suitable element. An interface receives input, sends output, processes the input and/or output, and/or performs other suitable operations. An interface may comprise hardware and/or software. Logic performs the operations of the component. For example, logic executes instructions to generate output from input. Logic may include hardware, software, and/or other logic. Logic may be encoded in one or more non-transitory, tangible media, such as a computer readable storage medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 200 without departing from the scope of the invention. For example, system 200 may include any number of assembly modules 220, rules engines 110, decision engines 150, and external modules 250. As another example, decision module 150 may communicate a request for third party data 160 from external module 250. Furthermore, the components of system 200 may be integrated or separated. For example, assembly module 220 and rules engine 110 may be incorporated into a single component. In another example, rules engine 110 and decision engine 150 may be incorporated into a single component.

FIG. 3 illustrates an example method for encoding customer data. The method begins at step 310 when interface of rules engine 110 receives customer data 112a-112n from data sources 228a-228n. At step 312, rules engine 110 applies rules 120a-120n to transform a portion of customer data 112a-112n into one or more data segments. For example, rules engine 110 may apply rule 120a to transform a portion of customer data 112a-112n into code segment "X1". As another example, rules engine 110 may apply rule 120b to transform a portion of customer data 112a-112n into code segment "Y2". Rules engine 110 may update rules 120a-120n periodically or continuously. At step 314, rules engine 110 generates customer profile code 140 based on the one or more data segments, for example "X1Y2". Customer profile code 140 is associated with at least one customer identifier 116. Customer identifier 116 may be a social security number, bank account number, or any other information that will identify customer 114 from the list of customers of enterprise 210. Rules engine 110 may update customer profile code 140 continuously or periodically.

At step 316, interface 242 of decision engine 150 receives third party data 160 associated with a request for customer information from external module 250. Third party data 160 is information that can be used to identify a customer, such as an address, telephone number, social security number, or bank account number. Decision engine 150 determines whether customer identifier 116 matches third party data 160 at step 318.

If customer identifier 116 matches third party data 160, the method proceeds to step 320. At step 320, interface 242 of decision engine 150 communicates customer profile code 140 to third party 162 at a communication time period. For example, if customer identifier 116 of customer 114 is represented as account number "ABCXYZ", and third party data 160 is represented as account number "ABCXYZ", then customer identifier 116 matches third party data 160 and interface 242 communicates customer 114's profile code 140 to third party 162. Interface 242 of decision engine 150 may communicate a plurality of customer profile codes 140 simultaneously, or decision engine 150 may transmit each customer profile code 140 separately to third party 162. In certain embodiments, interface 242 of decision engine 150 may communicate updated customer profile codes 140 to third party 162. In some instances, decision engine 150 may communicate customer profile codes 140 via an API. The communication time period indicates a time or periodicity to communicate the data. The communication time period can be a fixed time period, a variable time period, a time period that occurs when network resource usage is at a low period, or any indication of when interface 242 of decision engine 150 should communicate customer profile code 140.

If decision engine determines customer identifier 116 does not match third party data 160 at step 318, then decision engine 150 does not communicate customer profile code 140 to third party 162. In some embodiments, processor 244 of decision engine 150 generates a data report. For example, the data report may state that the third party data 160 did not match customer identifiers 116a-116n. In some embodiments, interface 242 of decision engine 150 may communicate the data report to third party 162. The data report may include information such as the number of requests for customer information communicated to decision engine 150 within a period of time, the number of requests processed by decision engine 150 within a period of time, or the number of matches or non-matches generated by decision engine 150.

Modifications, additions, or omissions may be made to the method depicted in FIG. 3. The method may include more, fewer, or other steps. For example, if customer identifier 116 matches third party data 160, interface 242 of decision engine 150 may communicate one or more rules 120a-120n to third party 162. As another example, if customer identifier 116 matches third party data 160, interface 242 of decision engine 150 may communicate code segments to third party 162 to facilitate decoding of customer profile code 140. As yet another example, steps may be performed in parallel or in any suitable order. Further, any suitable component of system 200 may perform one or more steps of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system, comprising:
a rules engine operable to:
store customer data, a first rule comprising a first plurality of conditions, and a second rule comprising a second plurality of conditions, wherein the customer data is associated with a particular customer;
transform a first portion of the customer data into a first code segment by applying the first rule and by satisfying a condition of the first plurality of conditions of the first rule;
transform a second portion of the customer data into a second code segment by applying the second rule and by satisfying a condition of the second plurality of conditions of the second rule; and
combine at least the first code segment and the second code segment to form a customer profile code, wherein the customer profile code is associated with a customer identifier;
a decision engine communicatively coupled to the rules engine and operable to:
store third party data associated with a request for customer information; and
match the customer identifier of the customer profile code to the third party data; and
an interface engine communicatively coupled to the decision engine and operable to communicate the customer profile code to a third party if the customer identifier of the customer profile code matches the third party data.

2. The system of claim 1, wherein if the customer identifier of the customer profile code matches the third party data, the interface engine is further operable to:
communicate the first rule and the second rule to the third party; and
communicate the first code segment and the second code segment to the third party to facilitate decoding of the customer profile code.

3. The system of claim 1, wherein the interface engine is further operable to receive the third party data from the third party.

4. The system of claim 1, wherein the interface engine operates an application programming interface (API), and the interface engine communicates the customer profile code to the third party by granting the third party access to the customer profile code via the API.

5. The system of claim 1, wherein:
the customer data comprises the customer's income and the customer's birth year;
each of the plurality of first conditions of the first rule is associated with an income bracket;
each of the plurality of second conditions of the second rule is associated with a birth year bracket;
applying the first rule comprises analyzing the customer's income against the income bracket conditions; and
applying the second rule comprises analyzing the customer's birth year against the birth year bracket conditions.

6. The system of claim 1, wherein the customer identifier is the customer's phone number, the customer's email address, or the customer's account number.

7. The system of claim 1, wherein the third party data is a phone number, an email address, or an account number.

8. The system of claim 1, wherein the third party is an e-commerce site, a social media site, or an aggregator.

9. The system of claim 1, wherein the customer profile code is an alphanumeric code.

10. A system, comprising:
one or more memories operable to store customer data, third party data, and one or more rules, each of the one or more rules comprising at least one condition, wherein the customer data is associated with a particular customer and the third party data is associated with a request for customer information;
one or more processors communicatively coupled to the one or more memories and operable to:
transform at least a portion of the customer data into a customer profile code by applying the one or more rules and by satisfying the at least one condition of each of the one or more rules, wherein the customer profile code is associated with a customer identifier; and
match the customer identifier of the customer profile code to the third party data; and
one or more interfaces communicatively coupled to the one or more processors and operable to communicate the customer profile code to a third party if the customer identifier of the customer profile code matches the third party data.

11. The system of claim 10, wherein if the customer identifier of the customer profile code matches the third party data, the interface is further operable to communicate the one or more rules to the third party to facilitate decoding of the customer profile code.

12. The system of claim 10, wherein the interface is further operable to receive the third party data from the third party.

13. The system of claim 10, wherein the interface operates an application programming interface (API), and the interface communicates the customer profile code to the third party by granting the third party access to the customer profile code via the API.

14. The system of claim 10, wherein the customer identifier is the customer's phone number, the customer's email address, or the customer's account number.

15. The system of claim 10, wherein the third party data is a phone number, an email address, or an account number.

16. The system of claim 10, wherein the third party is an e-commerce site, a social media site, or an aggregator.

17. The system of claim 10, wherein the customer profile code is an alphanumeric code.

18. A method, comprising:
receiving, by one or more interfaces, customer data, third party data, and one or more rules, each of the one or more rules comprising at least one condition, wherein the customer data is associated with a particular customer and the third party data is associated with a request for customer information;
transforming, by one or more processors, at least a portion of the customer data into one or more code segments by applying the one or more rules and by satisfying the at least one condition of each of the one or more rules;
combining, by the one or more processors, at least the one or more code segments to form a customer profile code, wherein the customer profile code is associated with a customer identifier;
matching, by the one or more processors, the customer identifier of the customer profile code to the third party data; and
communicating, by the one or more interfaces, the customer profile code to a third party if the customer identifier of the customer profile code matches the third party data.

19. The method of claim 18, wherein if the customer identifier of the customer profile code matches the third party data, further comprising:
- communicating, by the one or more interfaces, the one or more rules to the third party; and
- communicating, by the one or more interfaces, the one or more code segments to the third party to facilitate decoding of the customer profile code.

20. The method of claim 18, wherein the interface communicating the customer profile code to the third party is an application programming interface (API).

\* \* \* \* \*